United States Patent
Shyu et al.

(10) Patent No.: US 8,023,208 B2
(45) Date of Patent: Sep. 20, 2011

(54) MINIATURE STACKED GLASS LENS MODULE

(75) Inventors: San-Woei Shyu, Taipei (TW); Chih-Hsiung Huang, Taipei (TW); Chien-Lin Wu, Taipei (TW)

(73) Assignee: E-Pin Optical Industry Co., Ltd., Taipei (TW)

( * ) Notice: Subject to any disclaimer, the term of this patent is extended or adjusted under 35 U.S.C. 154(b) by 0 days.

(21) Appl. No.: 12/556,339

(22) Filed: Sep. 9, 2009

(65) Prior Publication Data

US 2010/0284077 A1 Nov. 11, 2010

(30) Foreign Application Priority Data

May 7, 2009 (TW) ................ 98207833 U

(51) Int. Cl.
*G02B 7/02* (2006.01)
*G02B 27/10* (2006.01)
(52) U.S. Cl. .............. 359/811; 359/819; 359/619
(58) Field of Classification Search .......... 359/811, 359/819, 808, 815, 619, 622, 642
See application file for complete search history.

(56) References Cited

U.S. PATENT DOCUMENTS

| | | | | |
|---|---|---|---|---|
| 5,615,052 | A * | 3/1997 | Doggett | 359/811 |
| 6,502,960 | B2 * | 1/2003 | Naoe et al. | 362/259 |
| 6,603,612 | B2 * | 8/2003 | Nakano | 359/819 |
| 6,870,693 | B2 * | 3/2005 | Ito | 359/819 |
| 7,183,643 | B2 | 2/2007 | Gibson et al. | |
| 7,187,501 | B2 | 3/2007 | Wakisaka | |
| 7,499,229 | B2 * | 3/2009 | Ishida et al. | 359/811 |
| 2001/0012162 | A1 * | 8/2001 | Kato et al. | 359/822 |
| 2004/0032671 | A1 * | 2/2004 | Wada et al. | 359/819 |
| 2005/0041215 | A1 | 2/2005 | Fujimori | |
| 2006/0107695 | A1 | 5/2006 | Chen | |
| 2006/0249859 | A1 | 11/2006 | Eiles et al. | |
| 2007/0043463 | A1 | 2/2007 | Ueno et al. | |
| 2007/0070511 | A1 | 3/2007 | Lee et al. | |

FOREIGN PATENT DOCUMENTS

| | | |
|---|---|---|
| JP | 63295448 | 12/1988 |
| JP | 63304201 | 12/1988 |
| JP | 02044033 | 2/1990 |
| JP | 2000227505 | 8/2000 |
| JP | 2000321526 | 11/2000 |
| JP | 2001194508 | 7/2001 |
| TW | 095101830 | 1/2006 |
| TW | 09513807 | 9/2006 |
| TW | M343166 | 1/2008 |
| WO | WO-2008011003 | 1/2008 |
| WO | WO-2008063528 | 5/2008 |

* cited by examiner

*Primary Examiner* — Mohammed Hasan
(74) *Attorney, Agent, or Firm* — Muncy, Geissler, Olds & Lowe, PLLC

(57) ABSTRACT

A miniature stacked glass lens module is disclosed. The miniature stacked glass lens module includes at least one stacked optical glass lens element, a lens holder and other optical element. The stacked optical glass lens element is formed by cutting along alignment notches on a glued and stacked optical glass lens array. Then the stacked optical glass lens element and other optical element are mounted into the lens holder to form a miniature stacked glass lens module. Thereby the precise alignment of the optical axis of the lens in the lens module can be achieved. The manufacturing processes of the lens module can be simplified dramatically and the manufacturing cost is reduced significantly.

8 Claims, 6 Drawing Sheets

MINIATURE STACKED GLASS LENS MODULE

BACKGROUND OF THE INVENTION

The present invention relates to a miniature stacked glass lens module, especially to a stacked glass lens module applied to small-size optical lenses of cameras of mobile phones, notebooks, personal digital assistant (PDA) and etc. The stacked optical glass lens is produced by cutting alignment notches of stacked and glued optical glass lens array.

Glass precision molding technology has been widely applied to manufacture aspherical molded glass lens with high resolution, good stability and low cost such as lens revealed in US2006/0107695, US2007/0043463, TW095101830, TW095133807, and JP63-295448 etc. A glass preform (or glass material) is set into a mold having an upper mold and a lower mold to be heated and softening. Then the upper mold and the lower mold are clamped correspondingly and apply pressure on the upper mold and the lower mold so as to make the soft glass perform have the same optical surfaces as that of the upper mold and the lower mold. After cooling, a molded glass lens with molding surfaces of the upper mold and the lower mold is produced. In order to reduce manufacturing cost, prior arts JP63-304201 and US2005/041215 provided a lens array formed by glass molding. As to a single lens-called a lens element hereunder, JP02-044033 revealed that a lens blank having a plurality of lenses is manufactured by movement of glass materials and multiple molding procedures. Then the lens array is cut into a plurality of lens elements.

The optical lens formed by glass molding is widely applied to assembled lenses of LED light sources, lenses of solar energy conversion systems, and optical lenses of mobile phone cameras. The assembled lens or optical lens is formed by a plurality of optical lenses with different lens power arranged with a certain spacing on the optical axis between one another on the optical axis. Thus while assembling, an optical axis of each optical lens must be aligned precisely so as to avoid the reduction of resolution. Moreover, the distance between two adjacent optical lenses (spacing on the optical axis) is fixed. Thus the assembling requires a complicated process and precise alignment process. Therefore, the yield rate is unable to increase and the cost down is difficult. Since that, the optical resolution (example as MTF effect) will be affected when the assembly having disalignment from optical axis. Thus lens alignment of the optical lens array is more complicated and important. As to the manufacturing of the optical lens array, JP2001194508 disclosed a manufacturing method of plastic optical lens array. Taiwanese patent No. M343166 reveals a manufacturing method of glass optical lens array. After being produced, the optical lens array can be cut to form a single optical lens element so as to be assembled in a lens module. Or the optical lens array is assembled with other optical elements to form a lens submodule array that is then cut to form a lens submodule. The lens submodule is assembled with lens holder, image sensors or other optical elements to form a lens module.

In manufacturing of lens module array, wafer level lens modules are revealed in U.S. Pat. No. 7,183,643, US2007/0070511, WO2008011003 and so on. Refer to FIG. 1, a lens module array generally includes an aperture 711, a cover glass 712, a plurality of optical lenses and an infrared (IR) cut lens 717. As shown in figure, a plurality of optical lenses form a three piece type optical lens set. The optical lens set includes a first optical lens 714, a second optical lens 715 and a third optical lens 716. Two adjacent optical lenses are separated by a spacer 713. After being assembled, a lens module array is formed and then is cut into a plurality of lens modules. Moreover, as shown in FIG. 2, a lens module disclosed in WO2008/063528 is formed by a stacking way. An aperture 711, a first optical lens 714, a spacer 713, a second optical lens 715, a spacer 713, a third optical lens 716, an image sensor 717 and a circuit board 718 are packaged in an encapsulant 719 to a lens module.

In a lens module array, while assembling a lens array with plurality of optical lenses, the alignment of the lens array has effects on resolution of the lens module. In US2006/0249859, imaging techniques are used to determine if stacked wafers are in proper alignment. Fiducial marks that were previously patterned on each wafer of the stack are exposed in an image produced by the infrared ray. In assembling of plastic optical lens arrays, JP2000-321526 and JP2000-227505 revealed bi-convex type optical lens arrays formed by combination of heights with crevices. As to U.S. Pat. No. 7,187,501, cone-shaped projections are provided on a periphery of a resin lens. A plastic resin lens array is formed by stacking the resin lens plates one over another through fitting these projections and holes to each other. However, in the conventional assembling way of projections and holes to form plastic optical lens array, material shrinkage after the plastic injection molding will lead to size change of the projections and the holes. Thus the location precision is affected and the alignment of the optical axis is difficult. Therefore, the applications of the plastic optical lens array is limited, especially during manufacturing of small-size lens module, the complicated processes cause cost increase. The molded glass lens has higher refractive index than the plastic lens and also with better thermostability so that the molded glass has been applied to various optical systems. Moreover, the optical lens array made from molded glass exhibit less shrinkage.

Thus there is a need to develop an optical glass lens array with simple structure and high precision so as to produce lens modules that meet requirement of compact design and mass production.

SUMMARY OF THE INVENTION

Therefore it is a primary object of the present invention to provide a miniature stacked glass lens module with a single optical lens applied to small-size optical lenses of cameras of mobile phones, notebooks, personal digital assistant (PDA) and etc. The stacked glass lens module includes a stacked optical glass lens element, a lens holder and other optical element. The module features on that: the stacked optical glass lens element is obtained by cutting along the alignment marks formed by intersection of alignment notches of a stacked optical glass lens array. The stacked optical glass lens array is produced by stacked the optical glass lens array with a slide by using cured glue in the glue grooves, wherein, the optical glass lens array having glue grooves and alignment notches. Then the stacked optical glass lens element and other optical element required are mounted into the lens holder to form a miniature stacked glass lens module.

It is another object of the present invention to provide a miniature stacked glass lens module with at least two optical lenses applied to small-size optical lenses of cameras of mobile phones, notebooks, personal digital assistant (PDA) and etc. The stacked glass lens module includes a stacked optical glass lens element, a lens holder and other optical element. The module features on that: the stacked optical glass lens element is obtained by cutting along the alignment marks formed by intersection of alignment notches of a stacked optical glass lens array. The stacked optical glass lens array is formed by stacking and gluing of a first optical glass lens array, a second optical glass lens array and/or another optical glass lens array. At least one optical glass lens array is disposed with alignment notches and at least one optical glass lens array having glue grooves that are filled with glue for attachment of optical glass lens arrays. The stacked optical glass lens element and other optical element required are mounted into the lens holder to form a miniature stacked glass lens module.

The other optical elements can be one of the followings or their combinations: an optical lens, a spacer, an aperture, a cover glass, an IR-cut glass, and an image sensor etc. The glue is a thermoset glue or UV curing glue.

The miniature stacked glass lens module is formed by the stacked optical glass lens element and other optical elements required being mounted into the lens holder. Because the stacked glass lens element can be assembled precisely and suitable for mass production, the lens module can be minimized and mass-produced easily.

DETAILED DESCRIPTION OF THE PREFERRED EMBODIMENT

Figure 1:
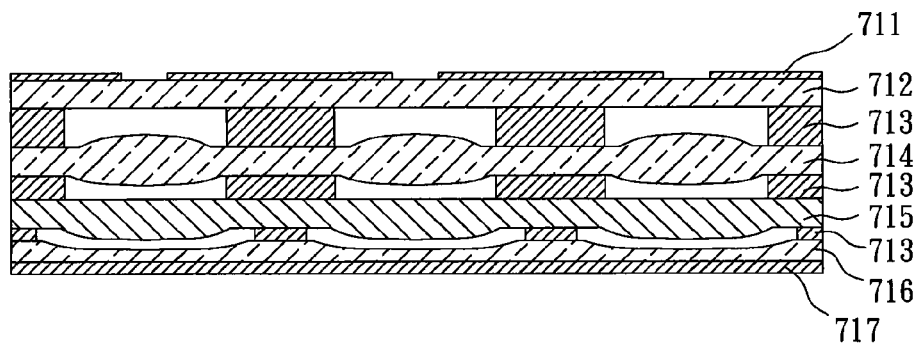
FIG. 1 is a schematic drawing showing a conventional optical glass lens module array.
Figure 2:
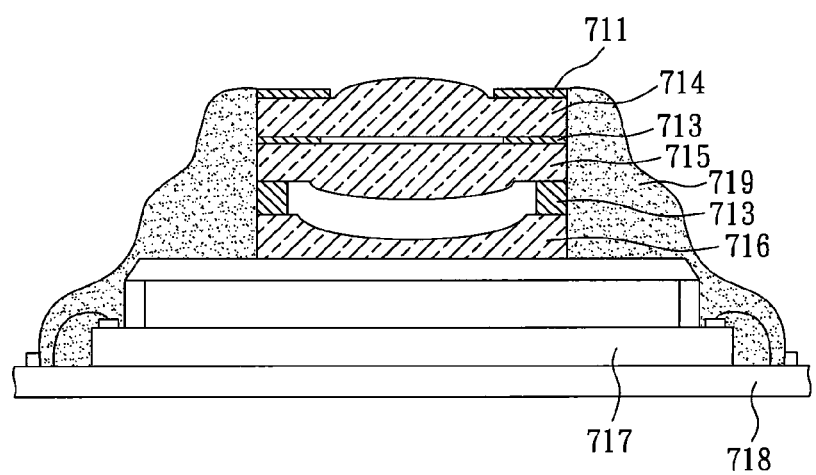
FIG. 2 shows packaging of a conventional lens module.
Figure 3:
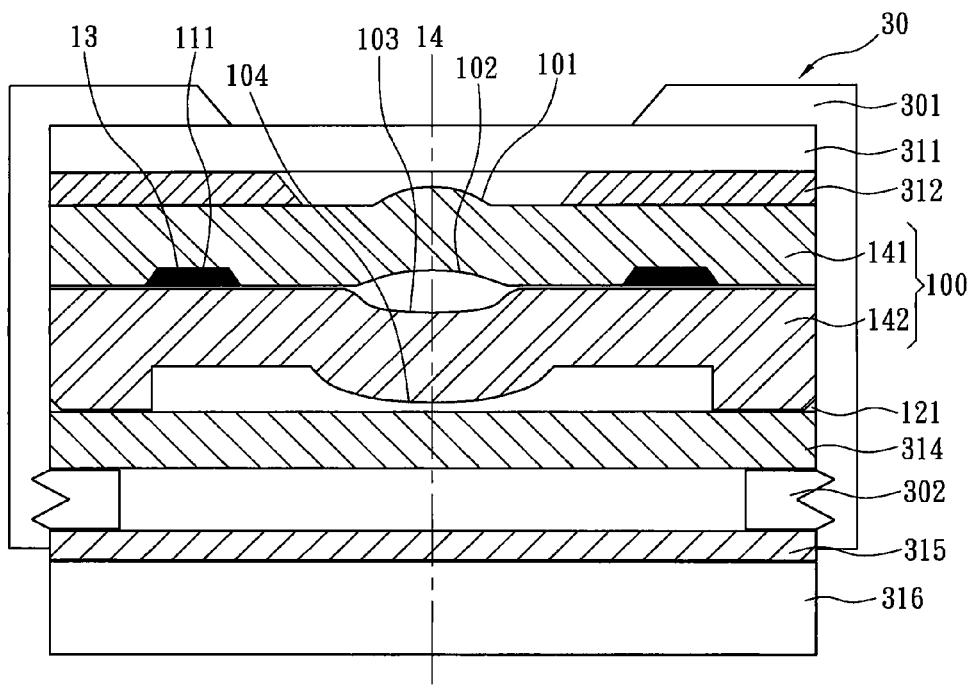
FIG. 3 is an embodiment of a lens module according to the present invention.
Figure 7:
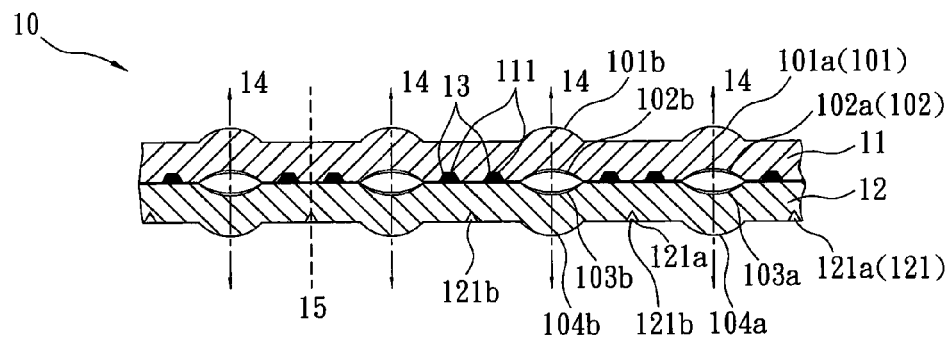
FIG. 7 is an embodiment of a stacked optical glass lens array according to the present invention.
Figure 8:
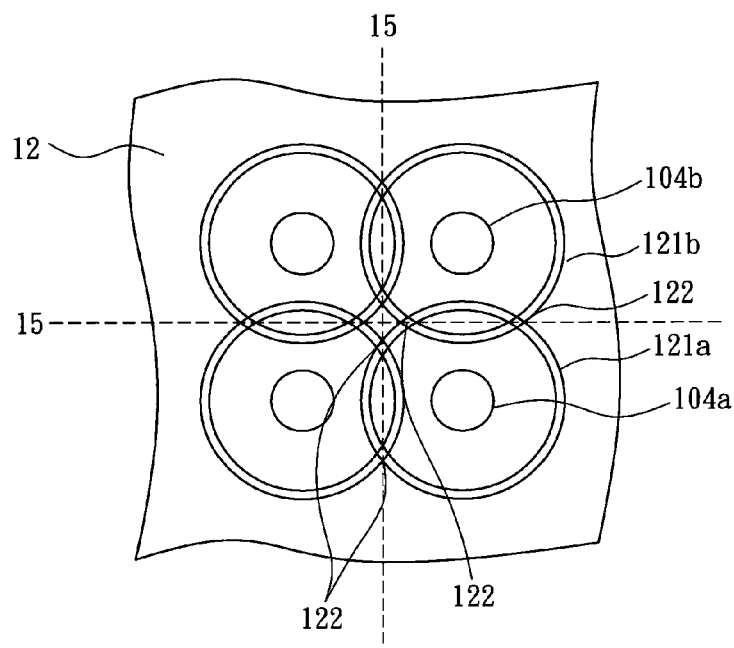
FIG. 8 is a partial bottom view of an embodiment of a stacked optical glass lens array according to the present invention.

Refer to FIG. 3, a miniature stacked glass lens module 30 of the present invention includes at least one stacked optical glass lens element 100, at least one lens holder 301 and a plurality of optical elements 311, 312, 314, 315, 316. The lens element 100 consists of a first and a second optical glass lens element 141, 142. The lens element 100 is formed by cutting of a stacked optical glass lens array 10 (as shown in FIG. 7) along alignment marks 122 (as shown in FIG. 8) formed by alignment notches 121 (121a, 121b, ... ). The lens array 10 is produced by optical glass lens arrays 11, 12 that include glue grooves 111 and alignment notches 121 (121a, 121b, ... ) and assemble with each other by glue 13 coated in the glue grooves 111. Then the lens element 100, and optical elements such as a cover glass 311, an aperture 312, a IR-cut glass 314, an image sensor 315 and a circuit board 316 mounted into the lens holder 301 to form a lens module 30, as shown in FIG. 3 but not limited to the embodiment shown in FIG. 3.

Refer to FIG. 7, the lens array 10 includes two lens arrays 11, 12 that are assembled and fixed by glue 13 with a preset spacing. The lens arrays 11, 12 are produced by multi-cavity glass molding and having optical area and non-optical area. The first lens array 11 is disposed with glue grooves 111 filled with glue 13 along the periphery of non-optical area of second optical surfaces 102 (102a, 102b, ... ). The shape and pattern of the glue groove 111 are not restricted. It can be a circular groove. After curing of the glue 13 in the glue groove 111, the two assembled lens arrays 11, 12 are fixed and stacked to form a stacked optical glass lens array 10.

Refer to FIG. 8, the second lens array 12 includes alignment notches 121 (121a, 121b, ... ) disposed on a periphery of non-optical area of fourth optical surfaces 104 (104a, 104b, ... ). The shape and pattern of each alignment notch 121 are not limited. The alignment notch 121 can be a circular V-shaped groove whose center of a circle is located on optical axes 14 of the fourth optical surface 104 (104a, 104b, ... ). Moreover, the diameter of each alignment notch 121 can be the same. Then intersection points of two adjacent alignment notches 121 (121a, 121b, ... ) form two alignment marks 122, as shown in FIG. 8. Thus along the alignment marks 122, the lens array 10 is cut precisely and singularized into a plurality of single stacked optical lens element 100, as the step S8 in FIG. 9.

Figure 9:
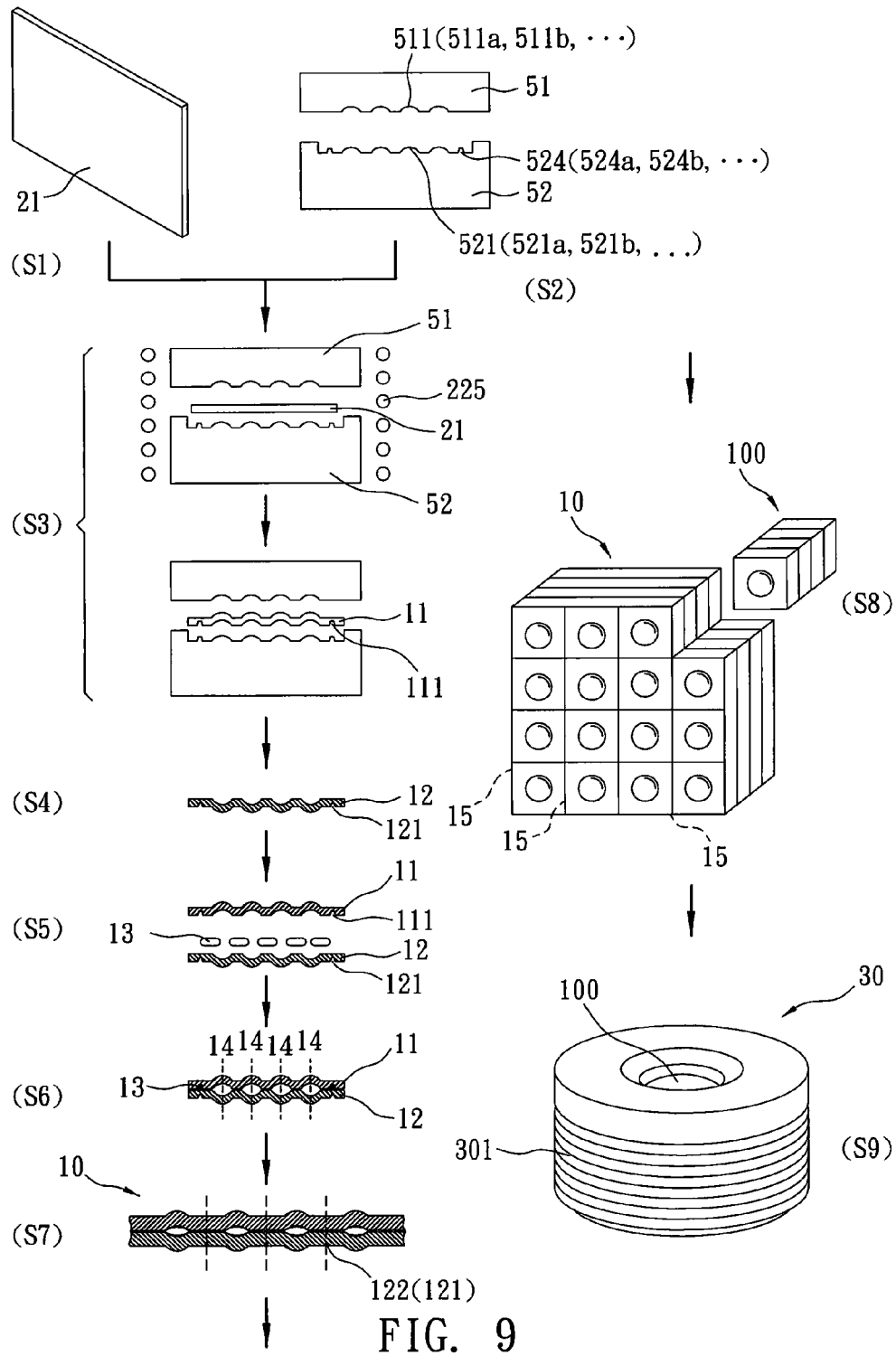
FIG. 9 is a manufacturing procedure of manufacturing a stacked optical glass lens array and a stacked lens module according to the present invention.
Figure 10:
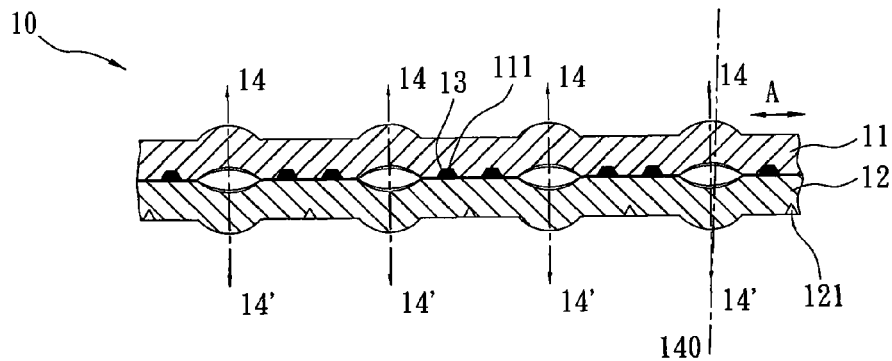
FIG. 10 is a schematic drawing showing alignment of optical axes of a stacked optical glass lens array according to the present invention.

As shown in FIG. 9, a manufacturing method of a lens module 30 according to the present invention includes the following steps:

S1: provide a glass blank 21,

S2: provide a first optical surface mold 51 and a second optical surface mold 52 of a lens array while respective optical surface mold having a first optical surface molding surface 511 (511a, 511b, ... ) and a second optical surface molding surface 521 (521a, 521b, ... ), the second optical surface mold 52 is further disposed with the glue groove molding surface 524 (524a, 524b, ... ), S3: set the glass blank 21 into the molds 51, 52. Not only heat the molds 51, 52 by a heater 225 but also apply pressure to the molds 51, 52 so as to form a first lens array 11 by molding processes. The first lens array 11 includes 16 (4×4) first optical surfaces and 16 corresponding second optical surfaces disposed whose non-optical area is disposed with 16 (4×4) glue grooves 111;

S4: manufacture a second lens array 12 according to the above method and the second lens array 12 includes 16 (4×4) third optical surfaces and 16 (4×4) corresponding fourth optical surfaces whose non-optical area is disposed with 16 (4×4) circular V-shaped alignment notches 121 (121a, 121b, ... );

S5: apply the glue 13 to the glue groove 111 between two adjacent lens arrays 11, 12;

S6: use a laser beam 140 for alignment of optical axes 14, 14' of the two lens arrays 11, 12 and the laser beam 140 aligns with the optical axes 14, 14', as shown in FIG. 10;

S7: cure the glue 13 to form a stacked optical glass lens array 10 precisely aligned with the optical axis 14, S8: connect two alignment notches 121 (121a and 121b) of the lens array 10 to form two alignment marks 122 and then connect the two alignment marks 122 to form a dicing line 15 along which the lens array 10 are singularized into 16 stacked optical lens elements 100 by a diamond grinding wheel;

S9: mount the lens element 100 and other optical elements into a lens holder 301 in turn to form a lens module 30.

Embodiment One

Figure 4:
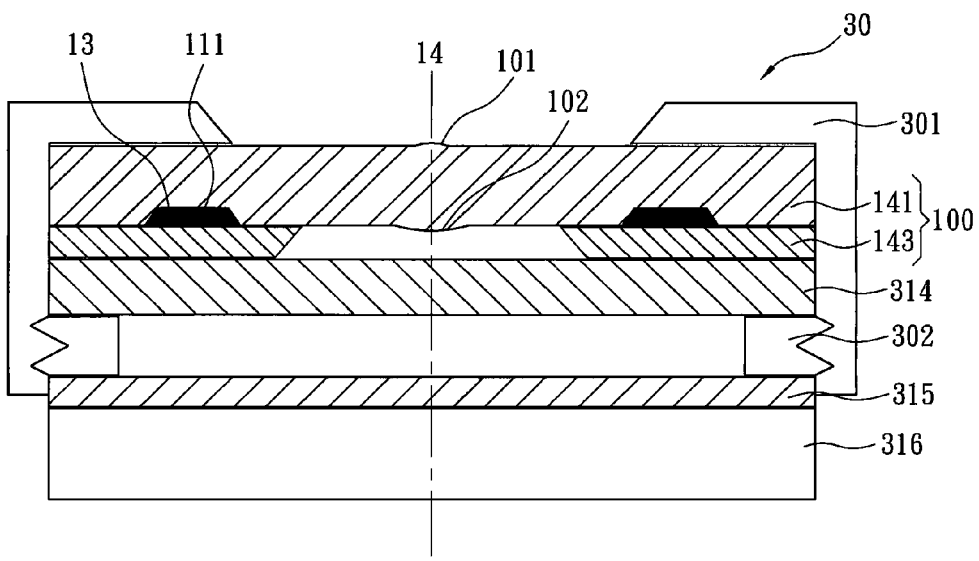
FIG. 4 is another embodiment of a lens module according to the present invention.

Refer to FIG. 4, this embodiment is a miniature stacked glass lens module 30 with a signal optical lens applied to web cameras. The miniature stacked glass lens module 30 includes a stacked optical lens element 100, a lens holder 301 and other optical elements having an IR-cut glass 314, an image sensor 315 and a circuit board 316. The stacked optical lens element 100 is formed by a first optical glass lens element 141 and a shade 143 and optical parameters thereof are shown in the list one.

List one

| Optical surface | Radius (mm) | spacing on optical axis (mm) | Diameter of the optical surface (mm) | Material |
|---|---|---|---|---|
| 101* | 1.061 | 1.06 | 0.35 | L-BSL7 |
| 102* | 0.097 | 0.099 | 0.95 | |
| 143 | Infinity | 0.30 | 1.09 | BK7 |
| 314 | Infinity | 0.51 | 1.23 | — |
| 315 | Infinity | — | 1.65 | — |

*aspherical surface

Figure 11:
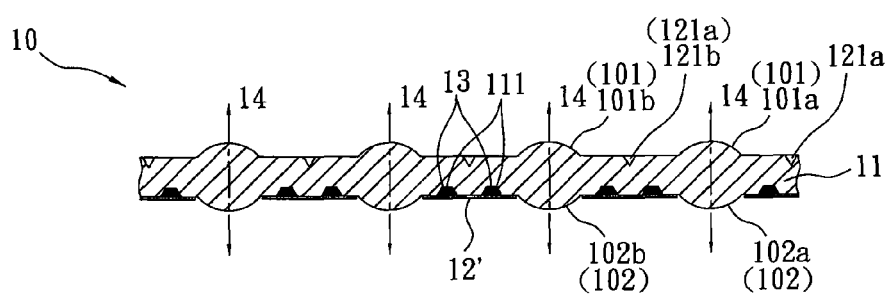
FIG. 11 is a stacked optical glass lens array of the embodiment in FIG. 4.

The lens element 100 is produced by cutting of the stacked optical glass lens array 10. Refer to FIG. 11, a 4×4 stacked optical glass lens array 10 includes a first lens array 11 and a shade array 12' that are fixed with each other by glue 13. The first lens array 11 is disposed with 4×4 first optical surfaces 101 (101a, 101b, . . . ) and corresponding 4×4 second optical surfaces 102 (102a, 102b, . . . ). The shade array 12' is an opaque compatible plastic piece for shading light and is disposed with 4×4 through holes corresponding to the second optical surfaces 102 (102a, 102b, . . . ). 4×4 circular V-shaped alignment notches 121 (121a, 121b, . . . ) are arranged around the non-optical area of the first optical surfaces 101 (101a, 101b, . . . ). The center of each alignment notch is on an optical axis 14 of each corresponding first optical surfaces 101 (101a, 101b, . . . ). The second optical surface 102 is disposed with 4×4 glue grooves 111 that are circular and with a trapezoid cross sections. While being assembled, each glue groove 111 is filled with glue 13 such as ultraviolet (UV) curing adhesives and then the shade array 12' is stacked thereover. Next the first lens array 11 and the shade array 12' are mounted in an assembly fixture (not shown in figure) and sent into an UV curing oven for curing of the glue 13 so as to form the stacked optical glass lens array 10.

Refer to FIG. 8, two adjacent alignment notches 121 such as 121a and 121b form two alignment marks 122. Join the two alignment marks 122 to form a dicing line 15. Use a diamond grinding wheel to cut along the dicing line 15 so as to obtain 16 stacked optical lens elements 100 with the same shape and the same size.

While assembling the lens module 30, as shown in FIG. 4, prepare a lens holder 301. The lens element 100 is mounted into the lens holder 301 and then the IR-cut glass is assembled into the lens holder 301. A fixed ring 302 is used to fasten and locate above components. Next a circuit board 316 preset with an image sensor 315 is set into the lens holder 301. Thus the lens module 30 is obtained. Thus the lens module 30 of the present invention is manufactured easily and quickly. And the lens module 30 can be mass-produced and the manufacturing cost can be reduced dramatically.

Embodiment Two

Refer to FIG. 3, this embodiment is a miniature stacked glass lens module 30 with two optical lenses applied to high-precision cellular phone lenses. The miniature stacked glass lens module 30 includes a stacked optical lens element 100, a lens holder 301 and other optical elements having a cover glass 311, an aperture 312 and an IR-cut glass 314. The stacked optical lens element 100 consists of a first optical glass lens element 141 and a second optical glass lens element 142 and optical parameters thereof are shown in the list two.

List two

| Optical surface | Radius (mm) | spacing on optical axis (mm) | Diameter of the optical surface (mm) | Material |
|---|---|---|---|---|
| 101* | 0.871 | 0.69 | 1.023 | L-BAL42 |
| 102* | 1.534 | 0.51 | 0.91 | |
| 103* | −4.741 | 1.13 | 1.3 | L-BAL42 |
| 104* | −19.042 | 0.10 | 2.57 | |
| 314 | Infinity | 0.70 | 2.97 | BK7 |
| 302 | Infinity | 0.22 | 3.32 | — |
| 315 | Infinity | — | 3.55 | — |

*aspherical surface

The lens element 100 is produced by cutting of a stacked optical glass lens array 10. Refer to FIG. 7, a 4×4 lens array 10 includes a first optical glass lens array 11 and a second optical glass lens array 12 that are stacked and fixed with each other by glue 13. The first lens array 11 is disposed with 4×4 first optical surfaces 101 (101a, 101b, . . . ) and corresponding 4×4 second optical surfaces 102 (102a, 102b, . . . ). The second optical surface 102 is arranged with 4×4 glue grooves 111 that are circular and with a trapezoid cross sections. The second lens array 12 is disposed with 4×4 third optical surfaces 103 (103a, 103b, . . . ) and 4×4 corresponding fourth optical surfaces 104 (104a, 104b, . . . ). The fourth optical surface 104 is mounted with 4×4 circular V-shaped alignment notches 121 (121a, 121b, . . . ) and the center of each alignment notch is on an optical axis 14 of each corresponding fourth optical surface 104 (104a, 104b, . . . ).

This embodiment is applied to a high-precision lens module 30 so that the optical axis of the first lens array 11 as well as that of the second lens array 12 must be aligned so as to meet requirement of tolerances. Refer to FIG. 10, while assembling the first lens array 11 and the second lens array 12, the second lens array 12 is set into an assembly fixture (not shown in figure). The glue groove 111 of the first lens array 11 is filled with glue 13 and then is stacked above the second lens array 12 to be set into the assembly fixture. Next use a laser beam 140 for alignment of optical axes. When a laser light 140 penetrates through the optical axis 14' of the second lens array 12, it aligns with the optical axis 14'. Then move the first lens array 11 horizontally, as an arrow A indicated, so as to make the laser light 140 align with the optical axis 14 of the first lens array 11. Thus the alignment of the two optical axes 14', 14 is finished. The alignment is performed only on 4×4 diagonal surface.

In this embodiment, the glue 13 is an ultraviolet (UV) curing adhesive. After alignment of the optical axes 14', 14, the first and the second lens arrays 11, 12 are fixed inside the assembly fixture to be sent into an UV curing oven for curing of the glue 13 and formation of a stacked optical glass lens array 10.

4×4 Circular V-shaped alignment notches 121 (121a, 121b, . . . ) are arranged at the fourth optical surface 104. By two adjacent alignment notches 121 such as 121a and 121b, two alignment marks 122 are formed. Connect the two alignment marks 122 to form a dicing line 15, the same with the embodiment one. Use a diamond grinding wheel to cut along the dicing line 15 so as to get 16 stacked optical lens elements 100 with the same shape and the same size. Moreover, the optical axes of the first, the second, the third, and the fourth optical surfaces have been aligned so as to be applied to mobile phone lenses.

The assembling method of this embodiment is as following: set the cover glass 311, the aperture 312, the lens element 100 and the IR-cut glass 314 into the lens holder 301 in sequence to be fastened and located by a fixed ring 302. Then a circuit board 316 preset with an image sensor 315 is assembled with the lens holder 301 to form a lens module 30. Thus the lens module 30 is manufactured quickly and conveniently. And the lens module 30 can be mass-produced and the manufacturing cost can be reduced dramatically.

Embodiment Three

Figure 5:
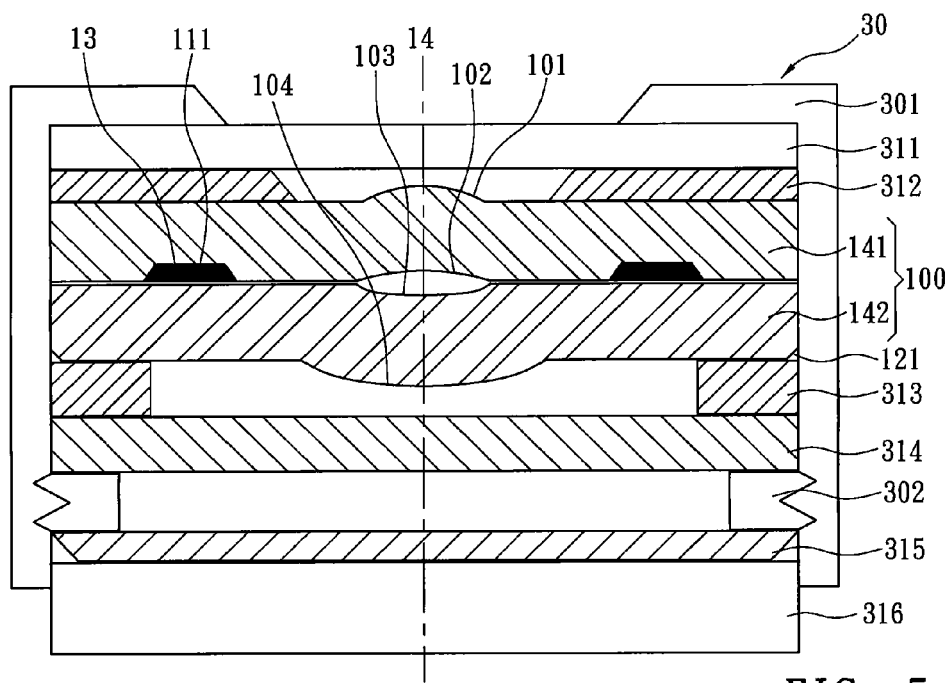
FIG. 5 is a further embodiment of a lens module according to the present invention.

Refer to FIG. 5, this embodiment is a miniature stacked glass lens module 30 with two optical lenses and spacers, being applied to high-precision cellular phone cameras, similar to the above embodiment. The miniature stacked glass lens module 30 includes a stacked optical lens element 100, a lens holder 301 and other optical element having a cover glass 311, an aperture 312, a spacer 313 and an IR-cut glass 314. The stacked optical lens element 100 consists of a first optical glass lens element 141 and a second optical glass lens element 142 and optical parameters thereof are shown in the list three.

List three

| Optical surface | Radius (mm) | spacing on optical axis (mm) | Diameter of the optical surface (mm) | Material |
|---|---|---|---|---|
| 101* | 0.442 | 0.35 | 0.47 | L-BSL7 |
| 102* | 0.914 | 0.17 | 0.52 | |
| 103* | −2.178 | 0.39 | 0.58 | L-LAM69 |
| 104* | −1.690 | 0.20 | 0.97 | |
| 313 | Infinity | 0.45 | 1.12 | |
| 314 | Infinity | 0.25 | 1.22 | BK7 |
| 302 | Infinity | 0.05 | 1.68 | — |
| 315 | Infinity | — | 1.76 | — |

*aspherical surface

The glue 13 used in this embodiment is thermoset adhesive. The manufacturing method of the lens element 100 is the same with the embodiment two.

The assembling method of this embodiment is as following: set the cover glass 311, the aperture 312, the lens element 100, the spacer 313 and the IR-cut glass 314 into the lens holder 301 in turn to be fastened and located by a fixed ring 302. Then a circuit board 316 preset with an image sensor 315 is assembled with the lens holder 301 to form a lens module 30. Thus the lens module 30 is manufactured quickly and conveniently. And the lens module 30 can be mass-produced and the manufacturing cost can be reduced dramatically.

Embodiment Four

Figure 6:
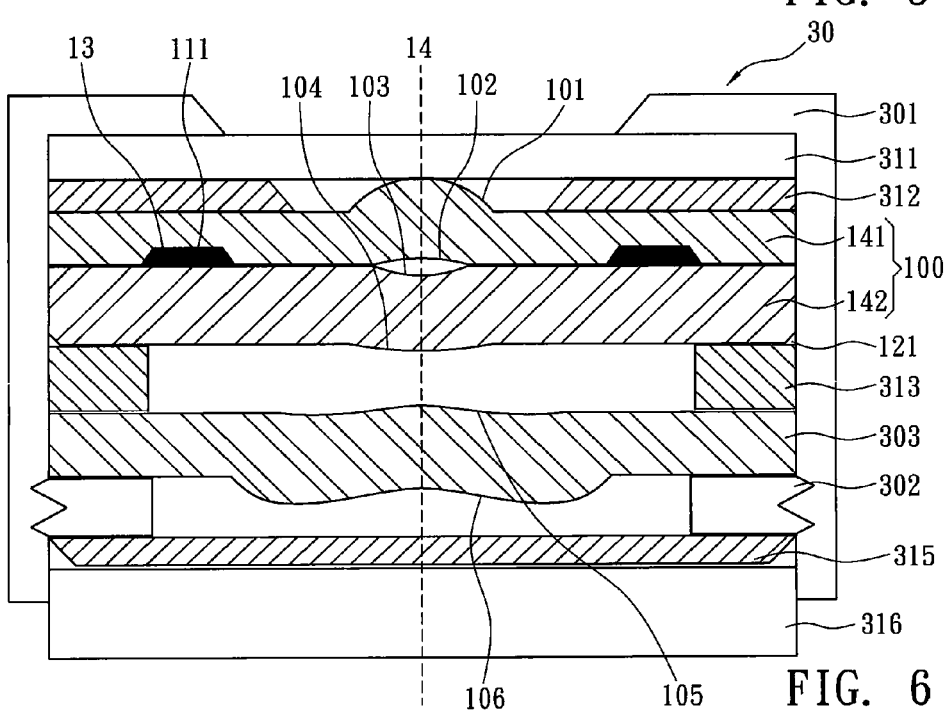
FIG. 6 is a further embodiment of a lens module according to the present invention.

Refer to FIG. 6, this embodiment is a miniature stacked glass lens module 30 with three optical lenses and spacers, being applied to mobile phone cameras with high pixels. The miniature stacked glass lens module 30 includes a stacked optical lens element 100, a lens holder 301 and other optical elements having a cover glass 311, an aperture 312, a spacer 313, an optical lens 303 and an IR-cut glass 314. The lens element 100 is composed of a first optical glass lens element 141 and a second optical glass lens element 142 and their optical parameters are shown in the list three.

List four

| Optical surface | Radius (mm) | spacing on optical axis (mm) | Diameter of the optical surface (mm) | Material |
|---|---|---|---|---|
| 101* | 1.015 | 0.64 | 1.52 | L-BAL35 |
| 102* | 2.746 | 0.30 | 0.97 | |
| 103* | −2.265 | 0.95 | 1.07 | S-NPH1 |
| 104* | −6.781 | 0.40 | 1.90 | |
| 105* | 2.312 | 0.89 | 3.03 | L-BSL7 |
| 106* | 1.784 | 0.22 | 3.92 | |
| 302 | Infinity | 0.70 | 4.29 | — |
| 315 | Infinity | — | 4.56 | — |

*aspherical surface

The glue 13 used in this embodiment is thermoset adhesive. The manufacturing method of the lens element 100 is the same with the embodiment two.

The assembling way of this embodiment is as following: set the cover glass 311, the aperture 312, the lens element 100 and the spacer 313 into the lens holder 301 orderly. Then the optical lens 303 is arranged under the spacer 313 and use an optical system for alignment of an optical axis of the optical lens 303. And a fixed ring 302 is used to fix and fasten above elements. Next a circuit board 316 preset with an image sensor 315 is assembled with the lens holder 301 to form a lens module 30. Thus the lens module 30 is manufactured quickly and conveniently. And the lens module 30 can be mass-produced and the manufacturing cost can be reduced dramatically.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A miniature stacked glass lens module comprising at least one stacked optical glass lens element, a lens holder and at least one optical element;
    wherein the stacked optical glass lens element is obtained by cutting along alignment marks formed by intersection of alignment notches of a stacked optical glass lens array,
    wherein the stacked optical glass lens array includes at least one optical glass lens array that includes non-optical area disposed with glue grooves and alignment notches; the glue groove is filled with glue so as to stack the optical glass lens array and a shade array with a certain spacing on the optical axis and form a stacked optical glass lens array after curing of the glue,
    wherein the lens holder is used to mount the stacked optical glass lens element and the optical element.

2. The device as claimed in claim 1, wherein the non-optical area of at least one optical glass lens array is disposed with glue grooves to be filled with glue and the non-optical area of at least one optical glass lens array is arranged with alignment notches.

3. The device as claimed in claim 1, wherein the optical element is an optical lens, an aperture, a spacer, a cover glass, an infrared (IR) cut lens, an image sensor, a circuit board, or their combinations.

4. The device as claimed in claim 1, wherein the glue for stacking the shade array and optical lens array is a thermoset adhesive that is cured by heat.

5. The device as claimed in claim 1, wherein the glue for stacking the shade array and optical lens array is UV curing adhesive that is cured by ultraviolet radiation.

6. The device as claimed in claim 1, wherein the alignment notches are circular V-shaped alignment notches arranged around the non-optical area of the optical glass lens array and a center of a circle of the circular V-shaped alignment notch is located on optical axis of each optical surface so that two alignment marks are formed by intersection of two adjacent alignment notches.

7. The device as claimed in claim 1, wherein the glue grooves extend in a same horizontal plane.

8. The device as claimed in claim 7, wherein the shade array is attached to a lowermost side of the stacked optical glass lens array.

* * * * *